(12) United States Patent
Shiobara

(10) Patent No.: US 6,249,512 B1
(45) Date of Patent: Jun. 19, 2001

(54) DATA TRANSMISSION SYSTEM AND ITS CONTROL METHOD AND MULTIPLEXING METHOD

(75) Inventor: Yasuhisa Shiobara, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/060,042

(22) Filed: Apr. 14, 1998

(30) Foreign Application Priority Data

Apr. 22, 1997 (JP) ................................................. 09-104749

(51) Int. Cl.[7] ....................................................... H04J 1/16
(52) U.S. Cl. ............................ 370/235; 370/445; 370/407
(58) Field of Search ................................... 370/254–258, 370/407, 408, 451, 240, 235, 425, 424, 452–453, 401–405, 445–448

(56) References Cited

U.S. PATENT DOCUMENTS

| | | | |
|---|---|---|---|
| 5,805,597 | * | 9/1998 | Edem .................................... 370/445 |
| 5,859,959 | * | 1/1999 | Kimball et al. .................. 395/182.02 |
| 5,870,566 | * | 2/1999 | Joh ........................................ 709/251 |
| 5,875,176 | * | 2/1999 | Sherer et al. .......................... 370/230 |
| 5,978,383 | * | 11/1999 | Molle .................................... 370/445 |
| 6,026,095 | * | 2/2000 | Sherer et al. ......................... 370/448 |

OTHER PUBLICATIONS

Martin, James, Local Area Networks, 1994, PP:209–251.*

* cited by examiner

*Primary Examiner*—David R. Vincent
(74) *Attorney, Agent, or Firm*—Oblon, Spivak, McClelland, Maier & Neustadt, P.C.

(57) ABSTRACT

A data transmission system, including a first sending and receiving control system and a second sending and receiving control system, which may be a media access control system of a CSMA/CD type system including plural terminals having data frame sending and receiving mechanisms connected to the ports of hub units in a star shape configuration, and wherein the hub units of both sending and receiving control systems are connected to each other with signal transmission lines, such that at a certain point in time, one of the plurality of hub units performs a control of the transmission approval function which enables a data frame from a corresponding terminal to be sent to the ports of the hub units in a prescribed sequence. The object of the invention is to achieve a data transmission system, including mutually connected plural hub units, capable of performing a realtime transmission right control function as a single united body even when the hub units of a star-shaped data transmission system are arranged at dispersed locations.

12 Claims, 11 Drawing Sheets

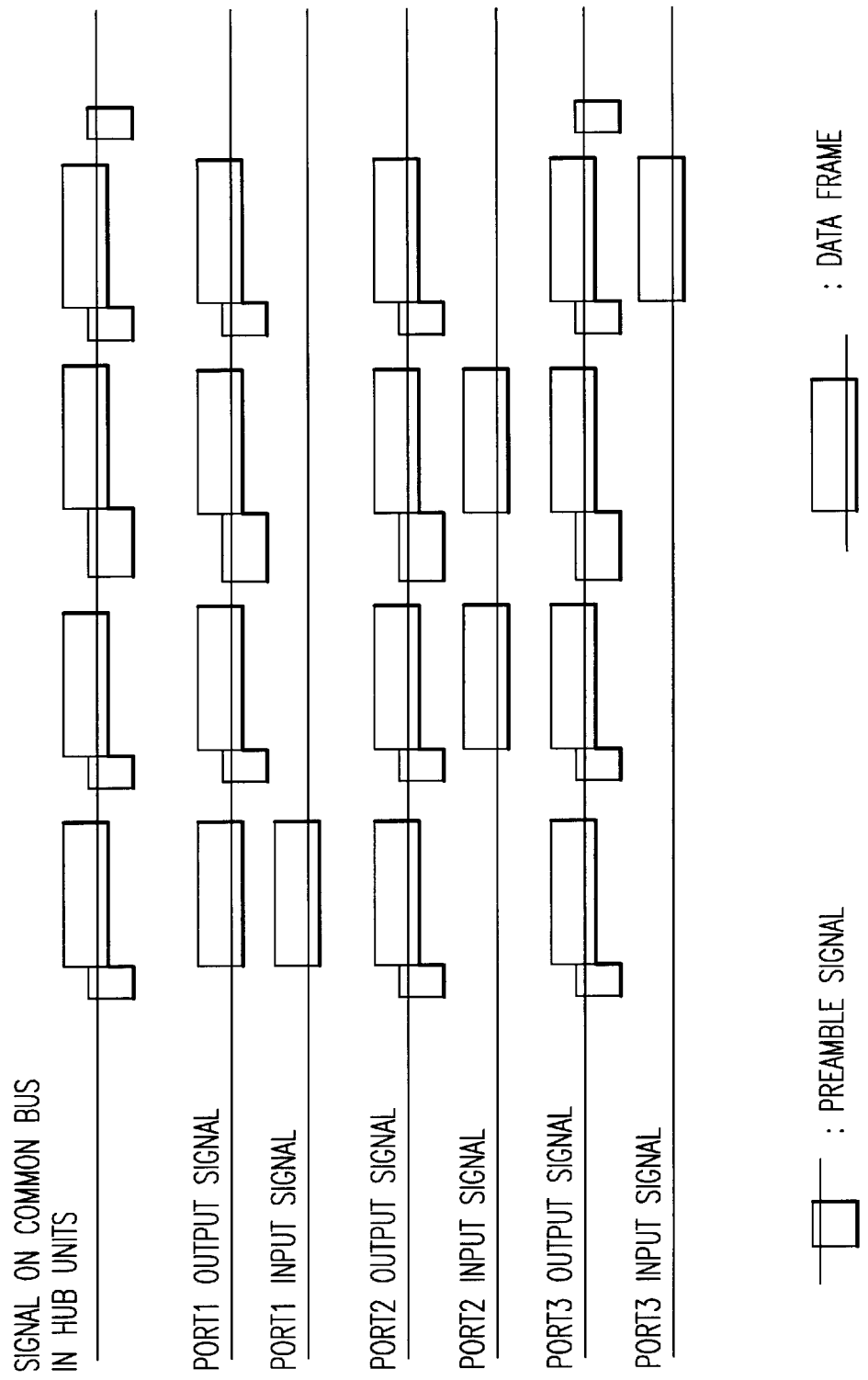

DATA TRANSMISSION SYSTEM AND ITS CONTROL METHOD AND MULTIPLEXING METHOD

BACKGROUND OF THE INVENTION

1. Field of the Invention

This invention relates to data transmission systems, which include a plurality of equipment able to send and receive data frames using CSMA/CD media access control, and plural terminals having data frame sending and receiving functions, connected to the ports of the 5 hub units in a star shape in the data transmission systems. The invention further relates to control methods and multiplexing methods for such data transmission systems.

2. Description of the Related Art

The ISO 88802/3 Standard (IEEE8802/3 Standard) system represented by the Ethernet which is the mainstream of the current LAN performs a media access control method of CSMA/CD or Carrier Sense Multiple Access/Collision Detection. The CSMA/CD method monitors signals on the shared transmission media for all terminals (all equipment stations) and if there are no signals, the CSMA/CD method permits a data frame to be sent out on the media and if there are signals, on the trasmission media delays the sending of the data frame. Further, during the sending of a data frame, the CSMA/CD method detects if there is a collision with other terminals and when a collision has taken place, the CSMA/CD method suspends the sending the data frame, and after a prescribed time has elapsed, the CSMA/CD method resumes the sending the data frame. When the traffic load of the transmission media is increased, because of such operation of the CSMA/CD method, the collisions take place more frequently and the data frames cannot be transmitted for an indefinite time. The CSMA/CD method is therefore not suited for use in time-critical control systems.

In order to achieve the time-critical processing capable of exchanging certain information within a prescribed time window, the applicant previously proposed a CSMA/CD enhanced data transmission system, in which plural terminals which function to send and receive data frames are connected to ports of the hubs in the star shape (The Specification of Patent Application No. 51984/1996).

Shown in FIG. 10 is a system diagram illustrating the brief configuration of the previously applied data transmission system in which the main stay is a hub unit (described as a realtime hub unit) able to mutually exchange information within a certain prescribed time period by giving the right to use the transmission line to each terminal by adding new functions to the hub units which conform with the ISO8802/3 Standard.

That is, the star-shaped data transmission system shown in FIG. 10 is comprised of realtime hub units (hereinafter, simply referred to as hub units) 100, a plurality of terminals 50 having transmission circuits adapted to the ISO8802/3 Standard and transmission cables 40. The terminals 50 are connected to ports 1, 2, 3 . . . of each hub unit 100 by transmission cables 40. In the star-shaped data transmission system, the transmission approval with the priority to use the transmission cable is repetitively given to each terminal 50 conforming to the ISO8802/3 Standard, which is arranged in a star shape and connected to one of the ports of the hub units 100, by the transmission approval control function of the hub units 100. That is, transmission approval is given repetitively to each of the terminals 50, for instance, each station at a particular time or according to a predetermined order, some terminal 50 is given several times or some terminal 50 is skipped or some terminal 50 is given transmission approval once per several times. The transmission approval given to each terminal controls the number of frames that can be sent out at a transmission time, and the time that frames can be transmitted and thus, the transmission right can be obtained within a specified time period.

FIG. 11 illustrates the transmission approval control timings in the hub unit 100. In the transmission approval control of the hub unit, a preamble signal containing no data information (a dummy frame and PRE shown in FIG. 11) from the hub unit 100 is transmitted to all terminals 50 except one specific terminal and the transmission of a data frame (DT in FIG. 11) is made impossible for all terminals except the one specific terminal. The idle time between the preamble signal PRE and the data frame DT is the idle time between frames specified in the ISO8802/3 Standard (e.g, a value less than 9.8 $\mu$sec. of ISO8802/3 Standard at 10 Mbps) so that a terminal does not move to the data frame sending operation by simply detecting no signal on the transmission line. When the data frame sending of a specific terminal is completed, the preamble signal PRE is sent to all terminals except another specific terminal and the right to use the transmission line is transferred to this specific terminal. This operation is repeated for every terminal in turn one at a time, in order according to a predetermined sequence, by jumping, or at a rate of once per several times and thus, all terminals are able to get the transmission right at regular intervals.

Further, by supervising a time in which each of the terminals 50 are able to send data at one time, an approved sending time is computed from a difference between the sending start time of the last time and the sending start time of a current sending time and an actual circulating time of the transmission right, the circulating time of the transmission right is made nearly constant by transferring the transmission right to a next terminal at the end point of the data frame DT sending time exceeding the approved sending time.

In the prior applied hub units 100 described above, to increase the number of terminals 50 or to distribute the terminals 50 in a wide range, it becomes necessary to make the hub unit 100 itself larger, the transmission cable 40 between the terminals 50 distributed in a wide range and the ports of the hub units 100 becomes long and signal attenuation must be compensated or wiring costs of the transmission cables 40 for eliminating noise effect to the transmission cables 40 will increase. In particular, when terminals are installed in each train car, signal lines must be wired extending over train cars, it is not desirable to concentrate signal lines to the hub units from the viewpoint of actual use.

That is, train cars may be separated when required and coupled to other train cars to compromise one train. It is therefore difficult to make the wiring of signal lines from train cars to concentrated hub units which correspond to the to flexibility of a train composition.

It is therefore desirable to provide a data transmission unit which functions like a single hub unit by dispersing plural hub units at required locations in a train car and consolidating them into one unit by connecting each to one another with the ports of the hub units and terminals connected by short signal lines.

SUMMARY OF THE INVENTION

It is an object of the present invention to provide a data transmission system comprising a plurality of hub units connected to each other, capable of performing the realtime transmission of right control as one unit even when the hub units of the prior applied star-shaped data transmission unit are arranged dispersedly.

In order to achieve the above object, the data transmission system according to the present invention is equipped with plural sending and receiving control systems with plural terminals having the data frame sending and receiving means connected to the ports of the hub units in a star-shape, the hub units of the plural sending and receiving control systems are connected by the signal transmission lines, and at a certain point of time, one in the plural hub units controls transmission approval by enabling the data trasmission system to send data from the corresponding terminal to the ports in the specified sequence.

Further, the data transmission system according to the present invention is equipped with plural sending and receiving control systems with plural terminals having the data frame sending and receiving means connected to hub unit ports in the star-shape and the hub units of the sending and receiving control systems connected together by signal transmission lines, a data frame sent out from a desired terminal can be sent to any signal transmission lines other than the signal transmission line applicable to the sent out data frame, the data frame received from the signal transmission line can be relayed to another signal transmission line via the hub unit port and one of the hub units provided with a relay control means that enables the hub unit to send a data frame from the said terminal to the ports at one time in a specified sequence.

In the data transmission system described above, the present invention is characterized in that each of the hub units is further provided with means to receive the transmission-line-control-right-transfer-signal showing the transmission-line-control-right for starting the transmission approval control and at the point of time when completing the transmission approval control, the hub unit is able to send out the transmission-line-control-right-transfer-signal to other signal transmission lines downstream and to confirm the delivery of the transmission-line-control-right-transfer-signal with a preceding downstream hub unit and to confirm the transfer of the transmission-line-control-right from the upper stream hub unit to the downstream hub unit or vice versa.

Further, in the data transmission system described above, the present invention is equipped with means to supervise the confirmation of the delivery of the transmission-line-control-right-transfer-signal from the downstream side hub unit for a specified time period after sending the signal to the downstream signal transmission line and if there is no response, stop sending of the transmission-line-control-right-transfer-signal, and when the hub unit abandons the transmission-line-control-right, the state without the transmission-line-control-right is generated tentatively and then, the transmission-line-control-right is again transferred from the upper stream side hub unit to the downstream side hub unit.

Further, the present invention is characterized in that in the data transmission system described above, the terminals have sending and receiving means which function as specified in the ISO8802/3 Standard, the transmission-line-control-right-transfer-signal is a significantly long no signal state time following the preamble signal specified in the Standard, the confirmation of the response of the transmission-line-control-right-transfer-signal sent from a succeeding downstream hub unit is made by the preamble signal or data frame specified in the said Standard.

Further, the present invention is characterized in that in the data transmission system described above, in the hub unit which received the transmission-line-control-right-transfer-signal, the transmission-line-control-right transfer-signal is not relayed to the port of the hub unit and the downstream side signal line but instead, the preamble signal specified in the ISO8802/3 Standard is sent to the port of the hub unit and also sent to the both sides of upper stream and down stream signal transmission lines, the transmission approval control starts, a data frame of the ISO8802/3 Standard from the port is sent to the upper stream or the downstream or the upper and downstream side after changing the data frame to the preamble signal and even when there is a signal input from the upper stream or the downstream side, the signal is not relayed to the port.

Further, the present invention is characterized in that in the data transmission system described above, in the hub unit having no transmission-line-control-right , a signal train of the ISO8802/3 Standard received from the upper stream or the downstream is relayed to the reverse side signal transmission line, a frame signal of the ISO8802/3 Standard is relayed to all ports and a preamble signal is inserted into all ports so that no signal state longer than the no signal period specified in the ISO8802/3 Standard is generated.

In order to achieve the object described above, the data transmission system control method according to the present invention is characterized in that the data transmission system is equipped with at least 3 sending and receiving control systems of which plural terminals having the data frame sending and receiving means are connected to the ports of the hub units in a star-shape and the hub units of the sending and receiving control systems are connected to each other with signal transmission lines, a relay control means to enable the data transmission system to send a data frame sent out from a desired terminal to any signal transmission lines other than the signal transmission line applicable to the sent data frame, relay the data frame received from the signal transmission line to other signal transmission lines via the port of the hub unit and at a certain point in time, enable one of the hub units to send a data frame from the corresponding terminal to the ports in a prescribed sequence, a means to confirm that each of the hub units is able to send a transmission-line-control-right-transfer-signal to another signal transmission line at the downstream or the upper stream when receiving the transmission-line-control-right-transfer-signal showing the transmission-line-control-right to start the transmission approval control and when completing the transmission approval control, confirm the delivery of the transmission line control transfer signal with a preceding downstream or upper stream hub unit and confirm that the transmission-line-control-right is transferred from the upper stream side hub unit to the downstream side hub unit or vice versa, a means to supervise the delivery of the transmission-line-control-right-transfer-signal from the downstream side or the upper stream side for a specified time after sending out the transmission-line-control-right-transfer-signal to the downstream or the upper stream signal transmission line and if there is no response, stops to sending the transmission-line-control-right-transfer-signal, the hub unit supervises the no signal state on the signal transmission line and the significant signal on the signal state transmission line ceases and a no signal continuing time specified in advance is elapsed, acquires the, transmission-line-control-right , sends a significantly long time transmission-line-control-right retaining signal to the upper stream and the downstream, and even if a significant signal is input from the downstream side when sending the transmission-line-control-right retaining signal, disregards the transmission-line-control-right retaining signal and when a significant signal is input from the upper stream side, stops to send the transmission-line-control-right retaining signal, abandons the transmission-line-control-right and the uppermost stream hub unit acquires the transmission-line-control-right by starting the control of the transmission approval after sending a significant long time transmission-line-control-right retaining signal.

In the data transmission system control method described above, a preamble signal may be used as the transmission-line-control-right retaining signal.

Further, the data transmission system control method according to the present invention is characterized in that the data transmission system is equipped with at least 3 sending and receiving control systems of which plural terminals having data frame sending and receiving means connected to ports of the hubs in a star-shape, the hubs of the sending and receiving control systems are connected with signal transmission lines,

- a relay control means to enable the data transmission system to send a data frame sent from a desired terminal to any signal transmission lines other than the signal transmission line applicable to the sent out data frame, relay the data frame received from the signal transmission line to other signal transmission lines via the port of the hub unit and at a certain point in time, enable one of the hub units to send a data frame from the corresponding terminal to the ports in a prescribed sequence,
- a means to confirm that each of the hub units is able to send out a transmission-line-control-right-transfer-signal to another signal transmission line at the downstream side or the upper stream side when receiving the transmission-line-control-right-transfer-signal showing the transmission-line-control-right to start the transmission approval control and when completing the transmission approval control, confirm the delivery of the. transmission line control transfer signal with a preceding downstream or upper stream hub unit and confirm that the transmission-line-control-right is transferred from the upper stream side hub unit to the downstream side hub unit or vice versa,
- a means to supervise the delivery of the transmission-line-control-right-transfer-signal from the downstream side or the upper stream side for a specified time after sending the transmission-line-control-right-transfer-signal to the downstream or the upper stream signal transmission line and if there is no response, stop sending the transmission-line-control-right-transfer-signal,
- when a new sending and receiving control system is added to the uppermost or the most downstream of the sending and receiving control system, the hub unit cuts signals off to the upper stream and the downstream at the initial starting by the power ON, after the preset waiting time has passed, supervises significant signals on the signal transmission lines at the upper stream side and the downstream side and when there is a significant signal input from the upper stream side or the downstream side, releases the cut of signal sending to the upper stream and down stream side, relays input signals to all ports and the reverse side signal transmission line, when receiving the transmission-line-control-right-transfer-signal from the upper stream as the most downstream, performs the transmission approval control and when there are significant signals only from the downstream side, acquires the transmission-line-control-right as being positioned at the uppermost stream side and adds a new sending and receiving control system to the uppermost or the most downstream side of the sending and receiving control system by starting a new transmission cycle.

In order to achieve the above object, the data transmission system multiplexing method according to the present invention is characterized in that the data transmission system is composed of two data transmission systems each of which is equipped with plural sending and receiving control systems with plural terminals having the data frame sending and receiving means connected to ports of each hub unit in star-shape and the hub units of the plural sending and receiving control systems connected by signal transmission lines, and the transmission approval control is performed so that at a certain point in time, one of the plural hub units is enabled to send a data frame from a corresponding terminal to the ports in a prescribed sequence, the data sending to the downstream side signal transmission line and the signal relay from the downstream side are cut off for the most downstream side hub unit of one of the plural data transmission systems, the upper stream side signal transmission line of the hub unit located at the uppermost stream side of the other data transmission system is connected to the downstream side signal transmission line of the hub unit and upon receiving the transmission-line-control-right-transfer-signal and after performing the transmission approval control by the hub unit, the transmission-line-control-right-transfer-signal to the downstream side is generated, the data sending cut off to the downstream side and the signal relay cut off from the downstream side are released and significant signals from the downstream side data transmission system are relayed to the ports that are connected to all the upper stream side hub units and thus, two separate data transmission systems are incorporated into a single functional system.

Further, the data transmission system multiplexing method according to the present invention is characterized in that the data transmission system is comprised of two sets of data transmission systems: a current use data transmission system and a standby data transmission system,

- each of the data transmission systems is equipped with plural sending and receiving control systems,
- plural terminals of the sending and receiving control systems have data frame sending and receiving means and are connected to ports of hub units in a star-shape,
- the hub units of the sending and receiving control systems are connected to each other by signal transmission lines and
- at a certain point in time, one of the plural hub units is enabled through the transmission approval control to send data frames from a corresponding terminal to the ports in a prescribed sequence,
- the hub units have two sets of current use and bypass signal input and current use and bypass signal output as the upper stream and downstream side signal transmission lines,
- the current use data transmission system is usually used and if the current use data transmission system becomes abnormal from disconnection of some of the hub units of the current use system or the signal transmission line, the system is changed over to the standby data transmission system and further, if some of the hub units of the standby data transmission system or the signal transmission line becomes abnormal, normal hub units and signal transmission lines of the current use and standby data transmission systems are connected to each other using the bypass signal input and bypass signal output of the hub unit and thus, two sets of the data transmission systems are united into one system and the data transmission function is maintained.

According to the present invention described above, the following actions and effects are obtained:

(1) It is possible to give a time certainty by the realtime hub units to the ISO8802/3 Standard data transmission system that has no time certainty and further, disperse the functions of the realtime hub units and achieve the geographical dispersed arrangement.

(2) As the collision specified in the ISO8-2.3 Standard is avoidable, the transmission efficiency is enhanced and the extension of distance between terminals and a turn around time of the transmission-line-control-right including a circulation time in the hub units are easily programmable.

(3) In order to achieve the dispersed arrangement of the hub units, a timing to control the transmission approval of the hub unit ports is given as the transmission-line-control-right-transfer-signal. Further, it is so controlled that the signal can be given repetitively. Signals specified in the ISO8802/3 Standard are usable for these signals. In addition, as the dispersed arrangement of the hub units can be realized as comprised with the ISO8802/3 Standard, the disfused arrangement can be realized simply as a system adaptable to the connection with terminals and equipment and diversion of components specified in the ISO8802/3 Standard and therefore, the hardware can be set at a cheap cost and the data transmission system can be finely managed by providing terminal functions in the hub units and filling up microcomputer software as described in the embodiments of the present invention.

(4) Although the hub units are described as concentrators of plural terminals, this system can be realized in a compact size using general use cheap components and programmable gate arrays that enable the integration of hardware logic. In this case, it becomes possible to realize a hub unit to a single terminal (it is no longer meaningless as a hub unit as a concentrator) and a physical layer in the bus structure specified in the ISO8802/3 Standard can be substituted for a realtime bus physical layer.

(5) When a system is composed in multiplexed structure, for instance, as a dual data system, as the managing function of the data transmission system, it is possible to realize a system extremely pursuing the continuous workability.

(6) As it is possible basically to incorporate two separate data transmission systems into one system by coupling them physically through one transmission cycle processing, it becomes possible to manage partially proper portions and by flexibly and properly combining and coupling them and operate continuously as a new data transmission system through the corresponding control programs in a microcomputer that are incorporated in the hub units.

BRIEF DESCRIPTION OF THE DRAWINGS

FIG. 11 is a diagram for explaining the transmission timing example of the star-shaped data transmission system shown in FIG. 10.

DETAILED DESCRIPTION OF THE PREFERRED EMBODIMENTS

Hereinafter, the embodiments of the present invention will be described with reference to the attached drawings.

Figure 1:
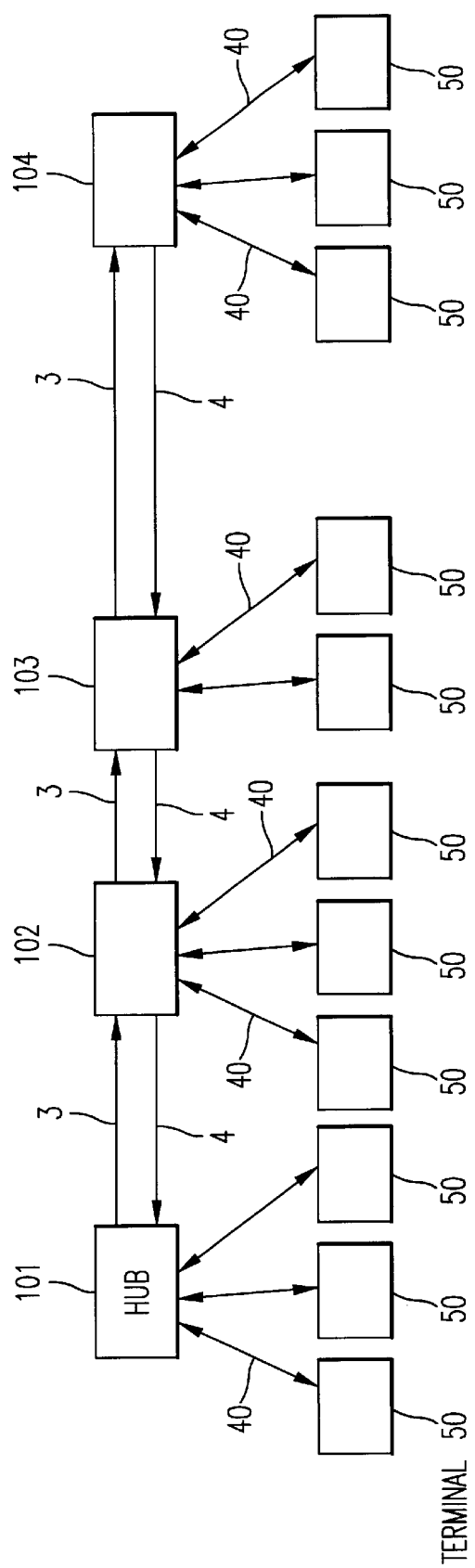
FIG. 1 is a system diagram for explaining the first embodiment of the data transmission system of the present invention.
Figure 10:
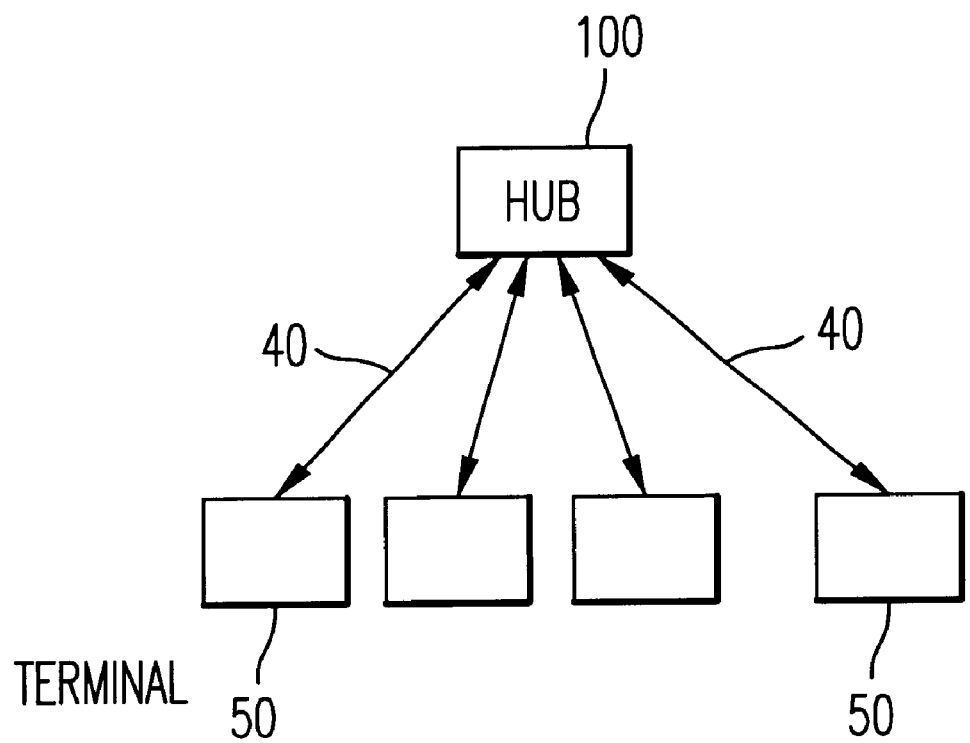
FIG. 10 is a system diagram illustrating one example of a conventional star-shaped data transmission system.

FIG. 1 is a system diagram showing a first embodiment of the present invention, that is, the data transmission system equipped with plural sending and receiving control systems, for instance, 4 star-shaped data transmission units shown in FIG. 10, which are of CSMA/CD type media access control systems of which plural (2 or 3 units in the figure) terminals 50 having the data frame sending and receiving functions are connected to ports of the hub units 101, 102, 103, 104, which are connected by a pair of signal transmission lines 3, 4 which are mutually in the reverse direction and at a certain point of time, one of the hub units 101–104 controls the transmission approval enabling it to send data frame from the corresponding terminal to the ports in the specified sequence.

Here, for the convenience of explanation, the hub unit 101 is regarded as the upper stream side and the hub unit 104 as the downstream side.

In the data transmission system in such the structure, it has a relay control means which is able to send data frames sent out from the terminals 50 connected to the hub units 101–104 to the upper stream side hub or the downstream side hub or the upper stream and downstream signal transmission lines, enable to relay data frames received from the upper stream or downstream signal transmission lines 3, 4 to the terminals via the ports, data frames received from the upper stream signal transmission lines or those received from the downstream signal transmission lines to the downstream and the upper stream signal transmission lines, respectively and at a certain point in time, plural hub units are connected in turn when one of plural hub units controls the transmission approval so that data can be exchanged between the terminals connected to plural hub units as if plural hub units are one hub unit.

Figure 2:
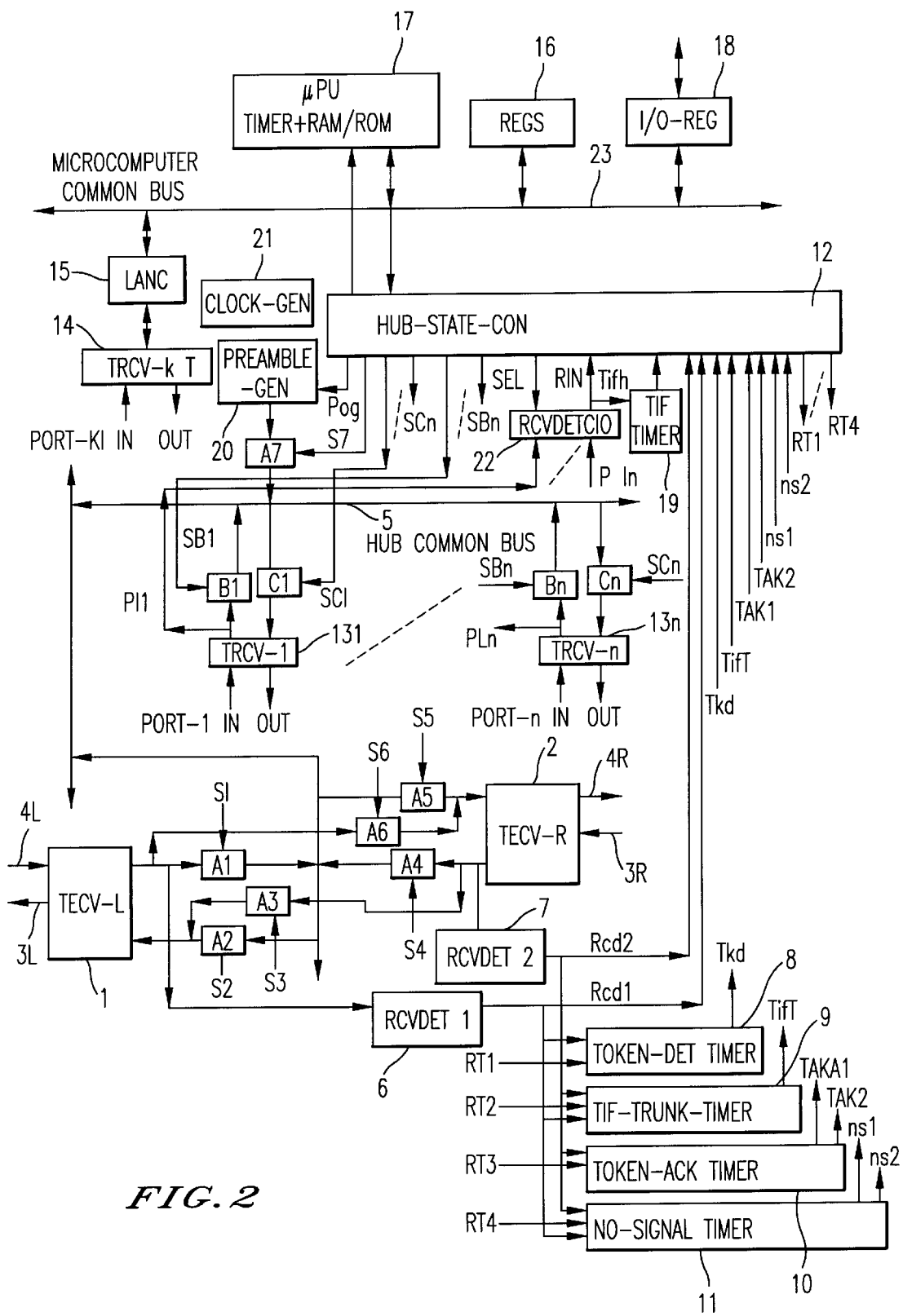
FIG. 2 is a block diagram for explaining hardware showing one example of the hub unit illustrated in FIG. 1.

FIG. 2 is a block diagram for explaining the hardware of the hub unit 102 out of the hub units 101–104 shown in FIG. 1. Other hub units 101, 103, 104 are all in the same structure as the hub unit 102 and their explanations will be omitted.

As described below, the hub unit 102 is composed of gate circuits A1, A2, A3. A4, A5, and A6 which compose a relay control means, a confirmation means comprising a timer circuit (Token-Det Timer) 8 and a hub state control circuit (Hub-State-CON) 12 and a sending stopping means comprising a timer circuit (Token-Ack Timer) 10 and the hub state control circuit 12.

A transceiver circuit (TECV-L) 1 is connected to signal transmission lines 3L, 4L at the upper stream side, a transceiver circuit (TECV-R) 2 is connected to signal transmission lines 3R, 4R at the downstream side, a hub common bus 5 is connected between the transceiver circuits 1 and 2, the gate circuits A1, A2, A3 of which outputs to input signals are controlled by control signals S1, S2, S3 are connected between the hub common bus 5 and the transceiver circuit 1 and further, the gate circuits A4, A5, A6 of which outputs to input signals are controlled by control signals S4, S5, S6 are connected between the hub common bus 5 and the transceiver circuit 2.

Here, when the control signal S1 of the gate circuit A1 is made active, significant signals that are received from the upper stream side can be led to the hub common bus 5 and when the control signal S4 of the gate circuit A4 is made active, significant signals that are received from the downstream side can be led to the hub common bus 5. In this case, either the control signals S5, S6 and S2, S3 of the gate circuits A5, A6 and A2, A3 are active or both are non-active. When the control signals S2, S5 of the gate circuits A2, A5 are made active, it becomes possible to output signals on the hub common bus 5 to the upper stream or downstream signal transmission lines 3L, 4L or 3R, 4R. Further, when the control signals S3, S6 of the gate circuits A3, A6 are active, it is possible to relay signals from the downstream side to the upper stream side or vice versa.

A significant signal detecting circuit (RCVDET1) 6 outputs a significant signal detecting signal Rcd1 when detecting a significant signal from the upper stream side of the transceiver circuit 1 and a significant signal directing circuit (RCVDET2) 7 outputs a significant signal detecting signal Rcd2 when detecting a significant signal from the downstream side of the transceiver circuit 2.

The timer circuit 8 is to measure the length of the transmission-line-control-right-transfer-signal received from the upper stream side and outputs a timing signal Tkd after passing its significant time measurement.

A timer circuit (Tif-Trunk Timer) 9 is to measure a no-signal present time of the significant signal detecting signal Rcd1 of the upper stream side significant signal detecting circuit 6 and a no-signal present time of the significant signal detecting signal Rcd2 of the downstream side significant signal detecting circuit 7, and when the said no-signal present time is measured, outputs a timing signal TifT that is a shorter elapse time than the no-signal time of the ISO8802/3 Standard.

The timer circuit (Token Ack Timer) 10 is to supervise an acknowledgement of response after sending the transmission control right transfer signal to the downstream and outputs a timing signal TAK1 to acknowledge a response received from the downstream side and outputs a detection waiting time elapsed signal TAK2 when no answer is received from the downstream.

A timer circuit (No-Signal Timer) 11 measures a no-signal detecting time on the upper stream and downstream side signal transmission lines and when the no-signal state is generated on the signal transmission lines as a result of abandonment of the transmission-line-control-right by the most downstream hub unit and after the elapsing of a prescribed time Tns1, the hub unit acquires the transmission-line-control-right as there is no significant signal input and outputs a timing signal ns1 to start the sending of a transmission right retaining signal. Further, regarding that there is no significant signal input, a timing signal ns2 is output as a count value of a prescribed time Tns2. The uppermost stream hub unit outputs a transmission right retaining signal for the said prescribed time Tns2.

To the input sides of the timer circuits 8, 9, 10, 11 signals RT1, RT2, RT3, RT4 that function as a reset signal or input change-over signal are input from the hub state control circuit (Hub-State-CON)12.

Transceiver circuits (TRCV1 . . . TRCVj) 131 . . . 13j are the circuits specified in the ISO8802/3 Standard and are corresponding to the hub unit ports Port-1 . . . Port-j. The terminals 50 are connected to the ends of Port-1 . . . Port-j, respectively. Output signals from these terminals 50 are Port-1 In . . . Port-j In and output signals from Port-1 . . . Port-j will become Port-1 Out . . . Port-j Out. From the transceiver circuits 131 . . . 13j, output signals PI1 . . . PIj are obtained based on the output signals Port-1 In . . . Port-j In from the terminals 50. The output signals PI1 . . . PIj of the transceiver circuits 131 . . . 13j are input to a significant signal detecting circuit (RCVDETC10) 22, the input signals from the transceiver circuit 131 . . . 13j are selected by an input signal selecting signal SEL from the hub state control circuit 12, a port input signal RIN is output which is then input to the hub state control circuit 12.

Further, the port input signal RIN is led to a timer circuit (Tif-Timer) 19 which is to measure a no-signal present period between data frames. The timer circuit 19 outputs a timing signal Tifh of a shorter elapse time than no-signal time and this timing signal Tifh is input to the hub state control circuit 12.

When control signals SB1 . . . SBj of gage circuits B1 . . . Bj are made active, the output signals PI1 . . . PIj of the transceiver circuits 131 . . . 13j are led to the hub common bus 5 via the gate circuits B1 . . . Bj and when control signals SC1 . . . SCj of gate circuits C1 . . . Cj are made active, signals from the hub common bus 5 are input to the transceiver circuits 131 . . . 13j via the gate circuits C1 . . . Cj from which the output signals PI1 . . . PIj of the transceiver circuits 131 . . . 13j are output and controlled and output from port-1 . . . Port-j and sent to applicable terminals 50.

A preamble generator (Preamble-GEN) 20 generates a preamble signal when the control signal Pag from the hub state control circuit 12 becomes active and outputs the preamble signal to the hub common bus 5 via the gate circuit A7 when the control signal S7 becomes active.

A clock signal generator (Clock-GEN) 21 generates clock signals that are used in the hub units.

A transceiver circuit (TRCV-kT) 14, conforming to the ISO8802/3 Standard, is connected to a microcomputer bus 23 via a LAN transmission control circuit (LANC) 15. The hub units are able to communicate with all terminals connected to the data transmission system and other hub units conforming to the ISO8802/3 Standard frame by the LAN transmission control circuit 15 and the transceiver circuit 14.

A register (REGS) 16 retains control parameters of the hub units and the data transmission system. A microcomputer (μPU Timer+RAM/ROM) 17 is composed of a microprocessor and a timer as its peripheral circuit, RAM and ROM which stores control program.

An I/O register circuit (I/O-REG) 18 of the microcomputer 17 is used for input of hardware component state, timer values of the timer circuits and for output for direct control of hardware but the details are omitted here.

The LAN transmission control circuit 15, the register 16, the I/O register circuit 18, the hub state control circuit 12 and the microcomputer 17 are connected to a microcomputer common bus 23.

Figure 3:
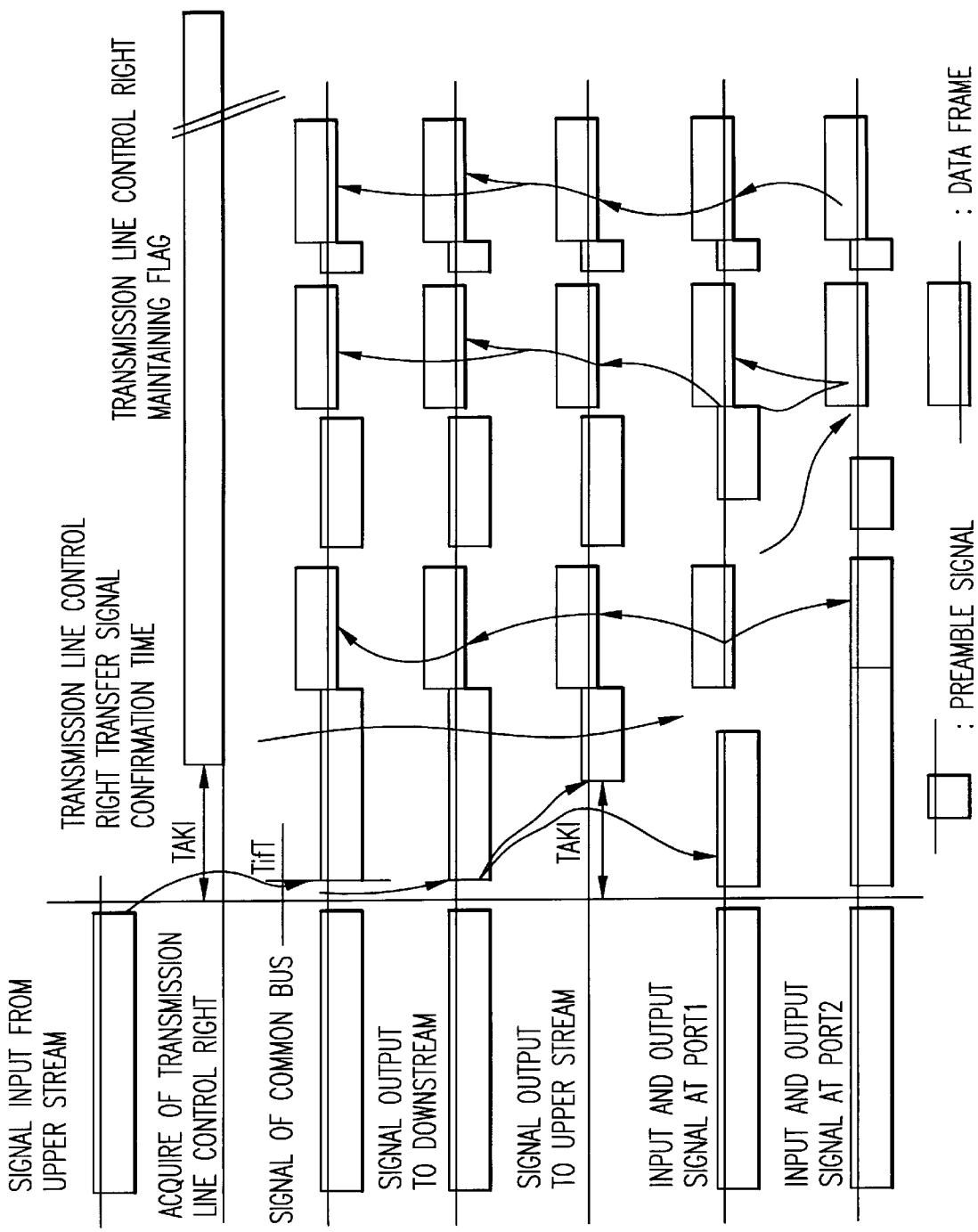
FIG. 3 is a diagram for explaining the delivery and acquisition of the transmission-line-control-right of the data transmission system shown in FIG. 1 and 2.

The timing of the hub units is controlled by the hub state control circuit 12. This timing control will be explained referring to FIG. 3. FIG. 3 shows the transfer of the transmission-line-control-right and the transmission-line-control-right acquiring timing. The no-signal state exceeding the time of timing signal TAK1 is detected following data frame from the upper stream side hub unit. This detection is performed as a timing signal Tkd from the timer circuit 8 by the significant signal detecting circuit 6.

On the other hand, the no-signal state of the timing signal TifT is detected by the timer circuit 9 and the timing signal TifT is output. The control signal pag from the hub state control circuit 12 is made active by the timing signal TifT so as not to exceed the no-signal time of the ISO8802/3 Standard, a preamble signal is generated from a preamble signal generator 20, the control signal S7 of the gate circuit A7 is made active and output to the hub common bus 5, the control signal SCj of the gate circuit Cj and the control signal S5 of the gate circuit A5 are made active and output to the ports by the TRCV-j and to the downstream side by the transceiver circuit 2.

While retaining the transmission-line-control-right a flag becomes active as the timing signal TAK1. From this point of time, the preamble signal is returned to the upper stream side hub unit as a response signal of receiving the transmission-line-control-right-transfer-signal. When the control signal S2 of the gate circuit A2 becomes active, the preamble signal on the hub common bus 5 is output to the upper stream side signal transmission line 3L by the transceiver circuit 1.

When the transmission control right retaining flag becomes active, the transmission approval control starts. The preamble signal output to Port-1 is cut when the control signal SC1 of the gate circuit C1 is made non-active. The ISO8802/3 Standard terminal 50 connected to Port-1 detects a no-signal state on the signal line and is able to output a data frame.

In FIG. 3, when one data frame is received through the Port-1 and using this data frame as PI1, detects the input of RIN via the transceiver circuit 22, and when the control signal S7 of the gate circuit A7 is made non-active and the control signal SB1 of the gate circuit B1 is made active a, data frame is output on the hub common bus 5 from Port-1 changing to the preamble signal and the data frame is relayed to all ports, the upper stream and the downstream sides. By the transmission approval control, the transmission approval is given to Port-1, Port-2, . . . and data frames are relayed repetitively.

Figure 4:
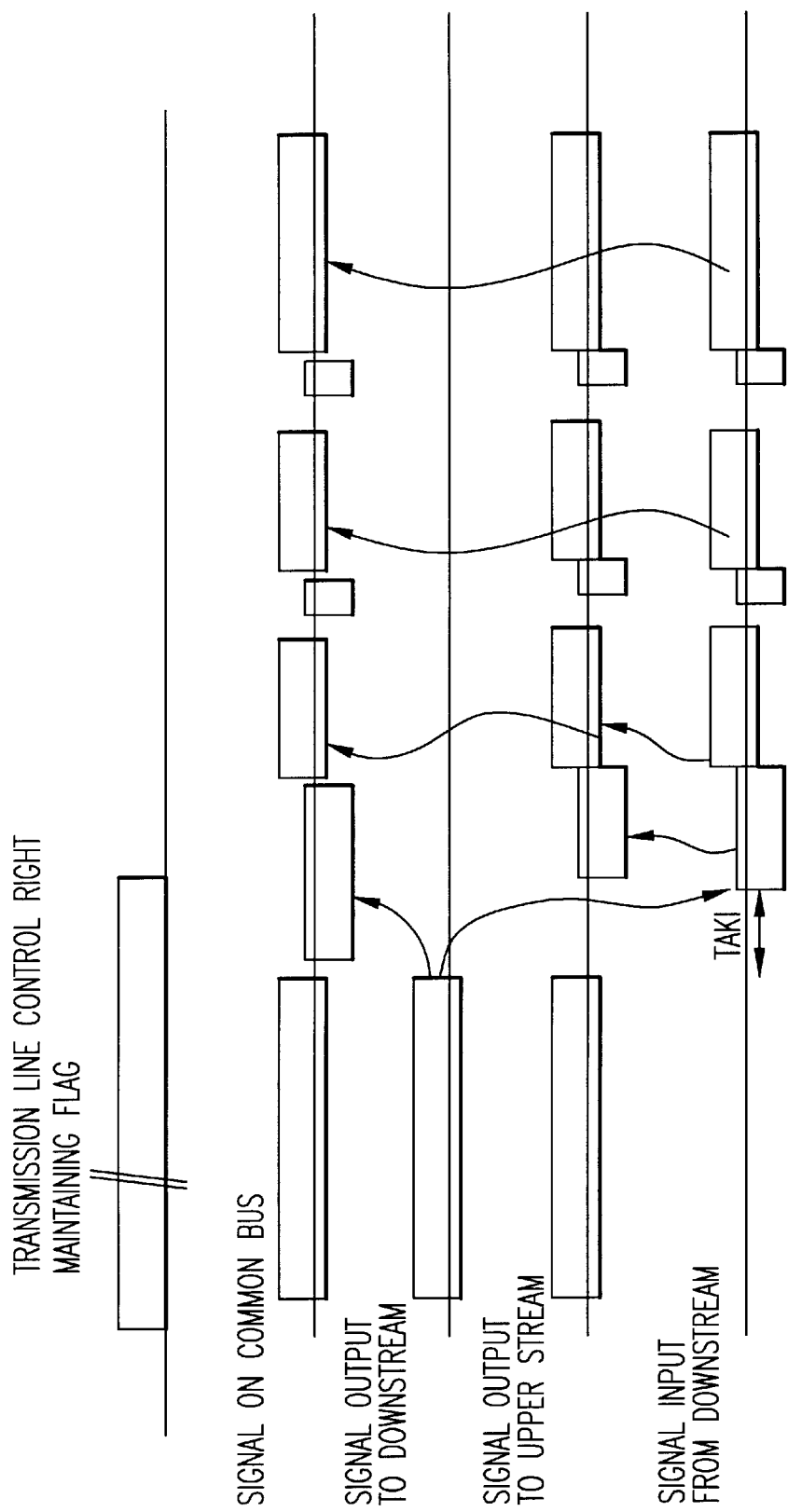
FIG. 4 is a diagram for explaining the delivery and transfer of the transmission-line-control-right of the data transmission system shown in FIG. 1 and 2.

FIG. 4 illustrates the delivery and transfer timings of the transmission-line-control-right . When completing the transmission line approval control, the hub unit retaining the transmission right puts the upper stream side and the downstream side signal transmission lines in the no-signal state by making the control signal S2 of the gate circuit A2 and the control signal S5 of the gate circuit A5 non-active.

On the other hand, the preamble signal is output to the ports when the preamble is output to the hub common bus 5. According to the transmission-line-control-right acquiring sequence described above, data frames following the preamble signal are received after the timing signal TAK1 from the downstream side+control delay+propagation delay time. When the control signal S7 of the gate circuit A7 is made non-active and the control signal S4 of the gate circuit A4 is made active by detecting the receipt of data frames by the significant signal detecting circuit 7, data frames received from the downstream are output to the hub common bus 5 and relayed to the ports. Further, when the control signal S3 of the gate circuit A3 becomes active, signals from the downstream side are relayed to the upper stream side.

Figure 5:
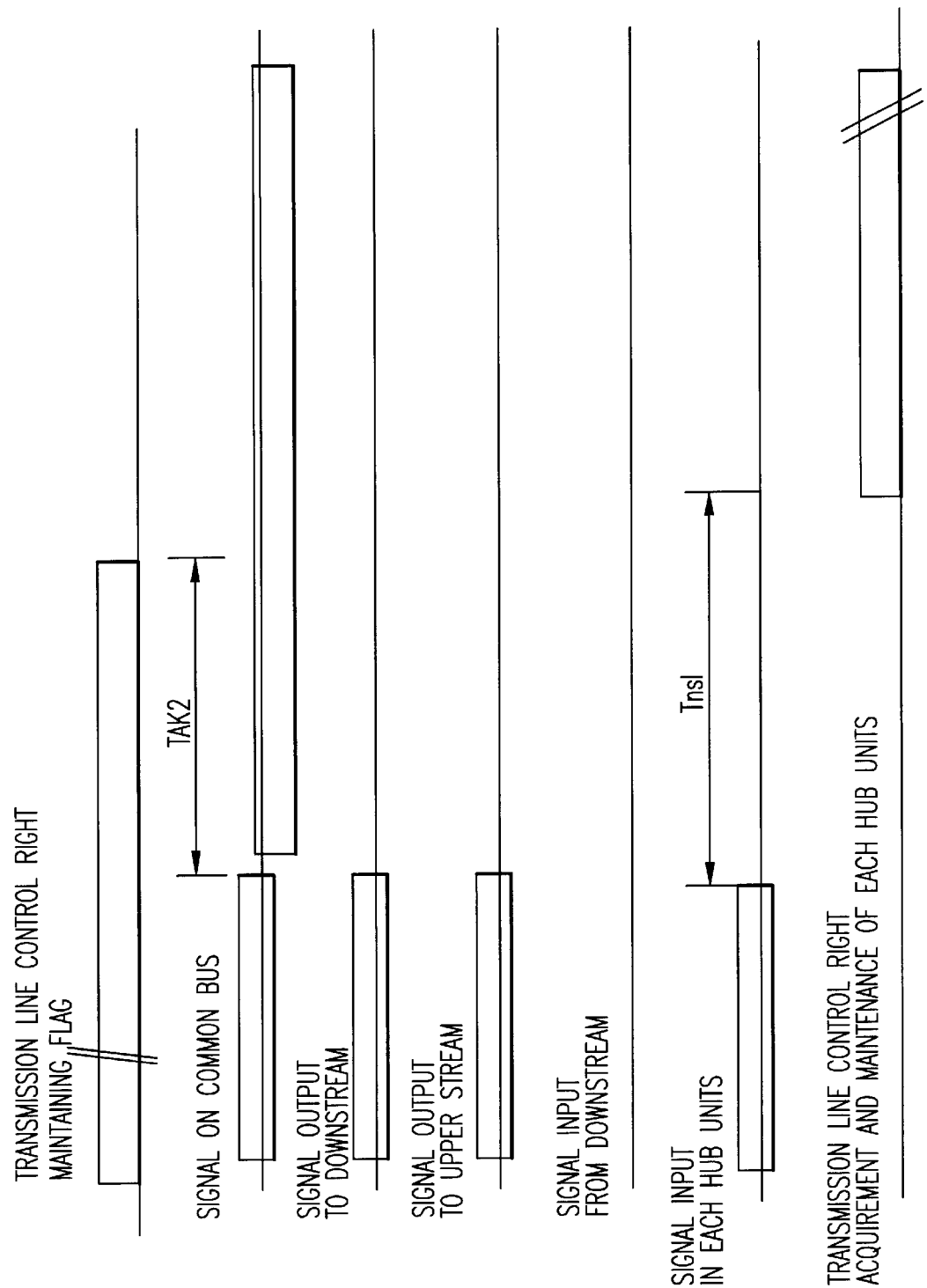
FIG. 5 is a diagram for explaining the delivery of the transmission-line-control-right and the most downstream hub unit of the data transmission system shown in FIG. 1 and 2.

FIG. 5 illustrates the timings for the transmission-line-control-right transfer in the most downstream side hub unit and no-signal detection in each hub unit. When the transmission approval control is completed, no-signal is output to the downstream side. The transmission-line-control-right-transfer-signal delivery response from the downstream side is supervised by the timing signal TAK2. Using the timing signal TAK2 from the timer circuit 10, the transmission-line-control-right retaining flag is made non-active.

On the other hand, the preamble is output on the hub common bus 5. The timer circuit 11 detects that there is no signal on the upper stream and downstream side signal transmission lines and the transmission-line-control-right is acquired at the timing of the signal ns1.

Figure 6:
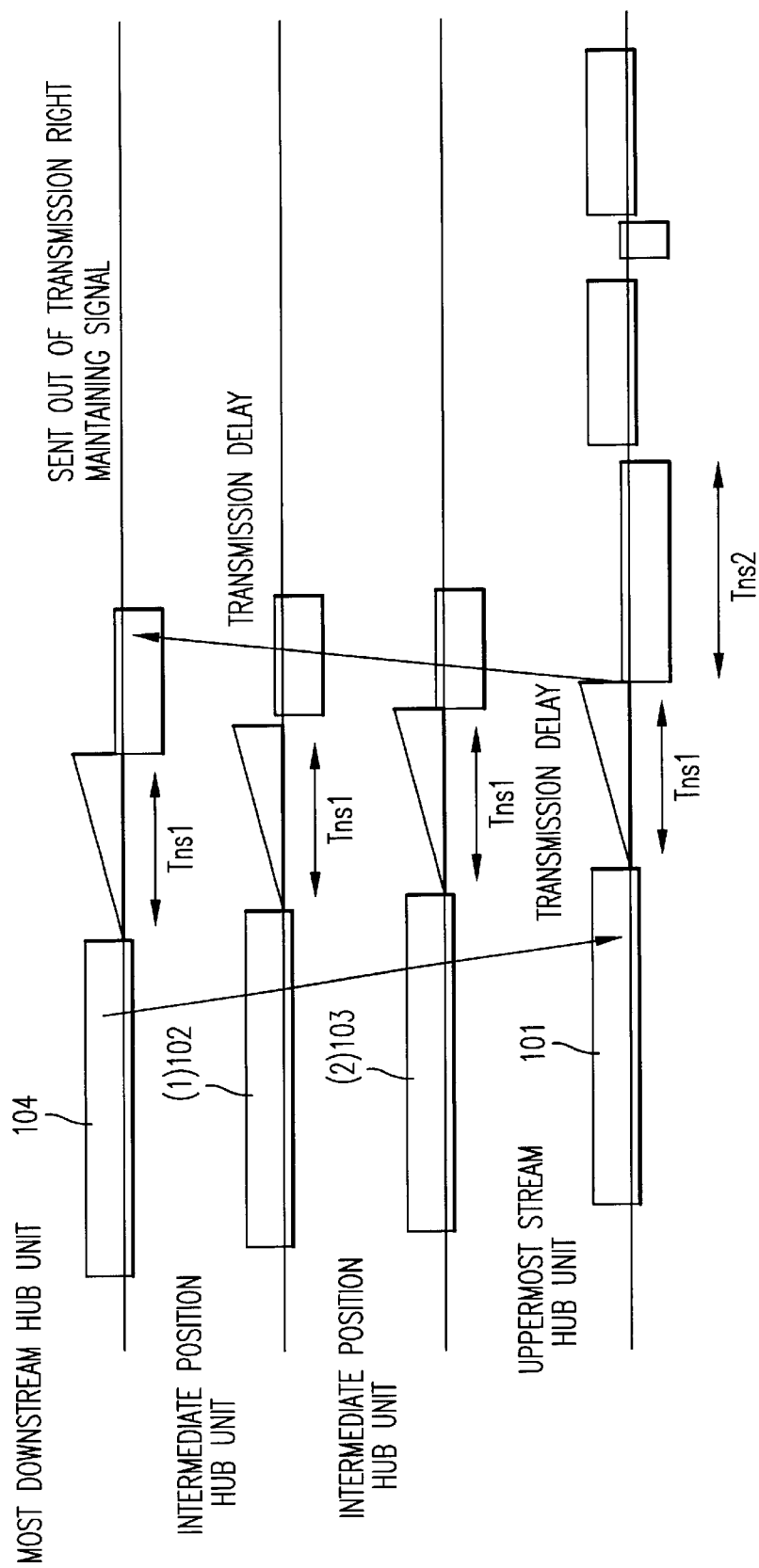
FIG. 6 is a diagram for explaining the transfer of the transmission-line-control-right to the uppermost stream hub unit and contention avoidance of the data transfer system shown in FIG. 1 and 2.

FIG. 6 illustrates the transmission right transfer timing from the most downstream side hub unit to the uppermost stream side hub unit for the transfer of the transmission control right to the uppermost stream side hub unit and avoidance of contention. After the Tns1 hour, the hub units 101–104 output the preamble signals to the upper stream and the downstream over the Tns2 hour to inform that the transmission right is acquired. If the preamble signal is received as the significant signal from the upper stream while outputting the preamble signal, the transmission-line-control-right retaining flag is made non-active and sending of the preamble signal is stopped and the signal input from the upper stream side is relayed. Thus, the contention between the hub units is avoided during the Tns2 hour and data frames following the preamble from the uppermost stream side hub unit are received by each of the hub units.

When incorporating two separate data transmission systems into one unit, the sending of signals to the downstream side signal transmission lines 3R, 4R and relay of signals from the downstream side are cut off by making the control signal S5 of the gate circuit A5 and the control signal S3 of the gate circuit A3 non-active for the most downstream side hub unit of one of the data transmission equipment and the upper stream side signal transmission line of the hub unit located at the uppermost stream of the other data transmission equipment are connected to the downstream side signal transmission line of that hub unit. When the most downstream side hub unit received the transmission-line-control-right-transfer-signal and after performing the transmission approval control, generates the transmission-line-control-right-transfer-signal to the downstream side and makes the control signal S5 of the gate circuit A5 and the control signal S3 of the gate circuit A3 active, the signal sending cut to the downstream side and the relay cut of signals from the downstream side transmission system are released and significant signal from the downstream side transmission system are led to the upper stream side.

Figure 7:
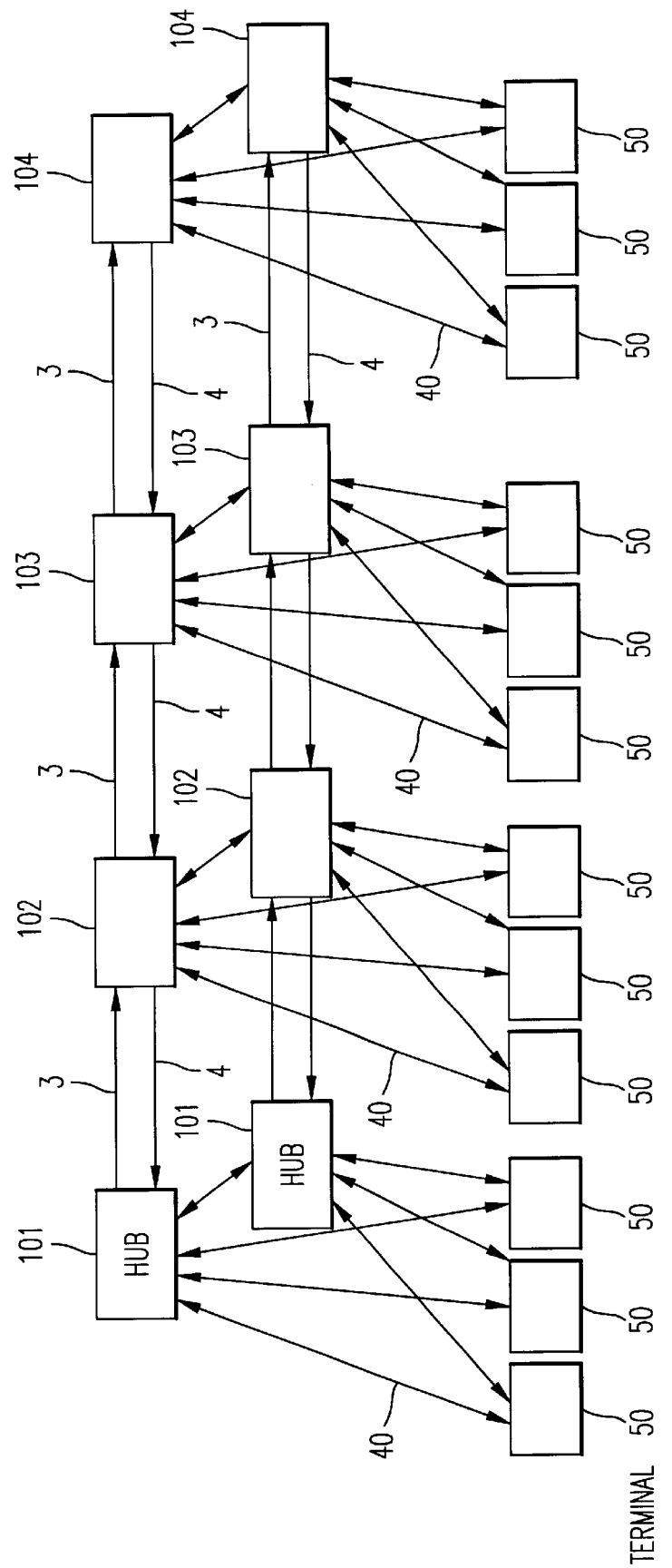
FIG. 7 is a system diagram for explaining the second embodiment of the data transmission system of the present invention.
Figure 8:
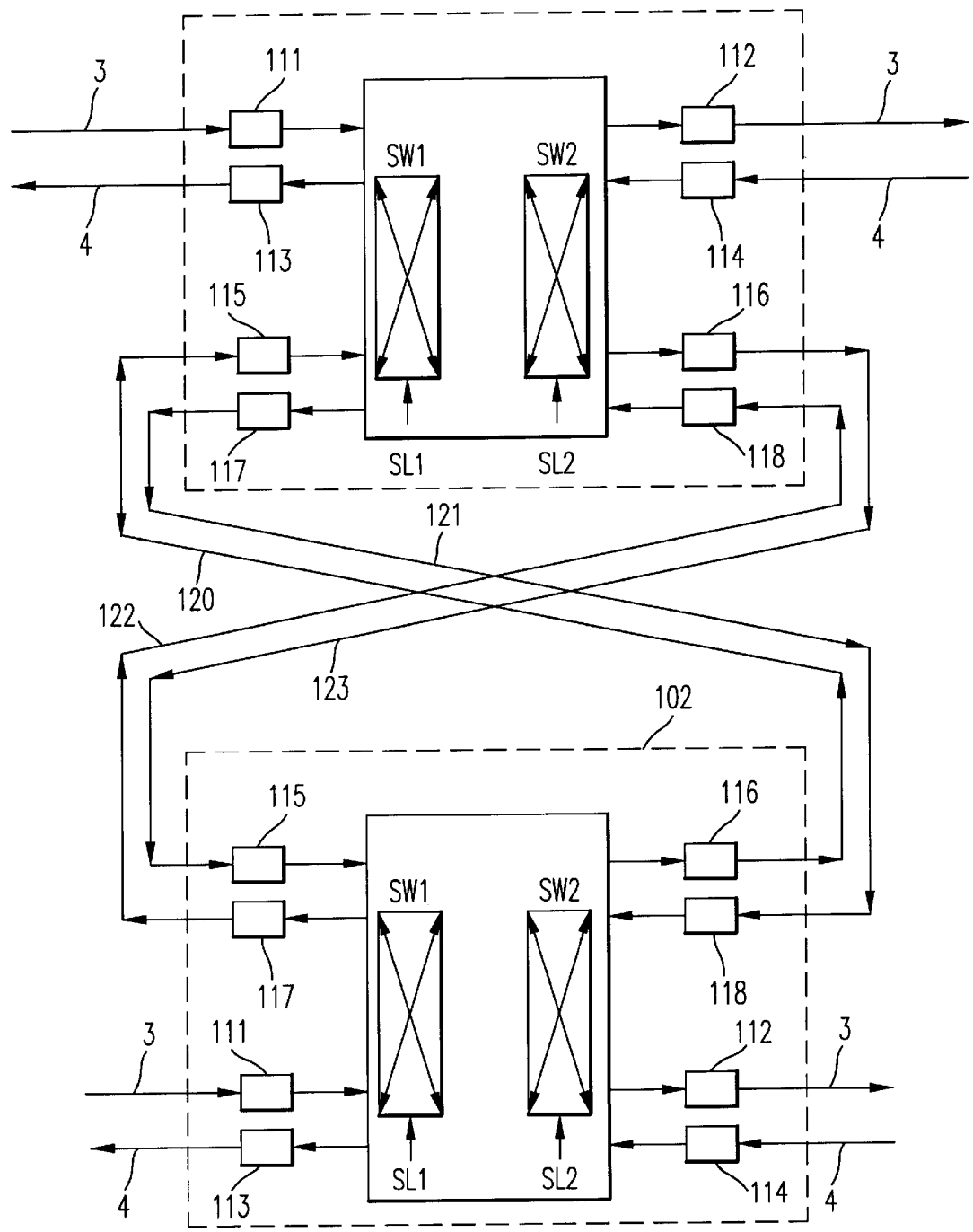
FIG. 8 is a diagram for explaining the mutual signal connection among the hub units shown in FIG. 7.

FIG. 7 is a system diagram illustrating the construction of data transmission systems which are dual systems of the first data transmission system, FIG. 8 is a diagram illustrating the connecting state of mutual signals between the hub units of the said data transmission systems and FIG. 9 illustrates an example of the data transmission systems reconstructed to avoid abnormal points in the systems. In this case, one example of the state of the data transmission systems reconstructed using normal component elements of the data transmission equipment partially containing abnormal points is shown.

Figures 9A, 9B, 9C:
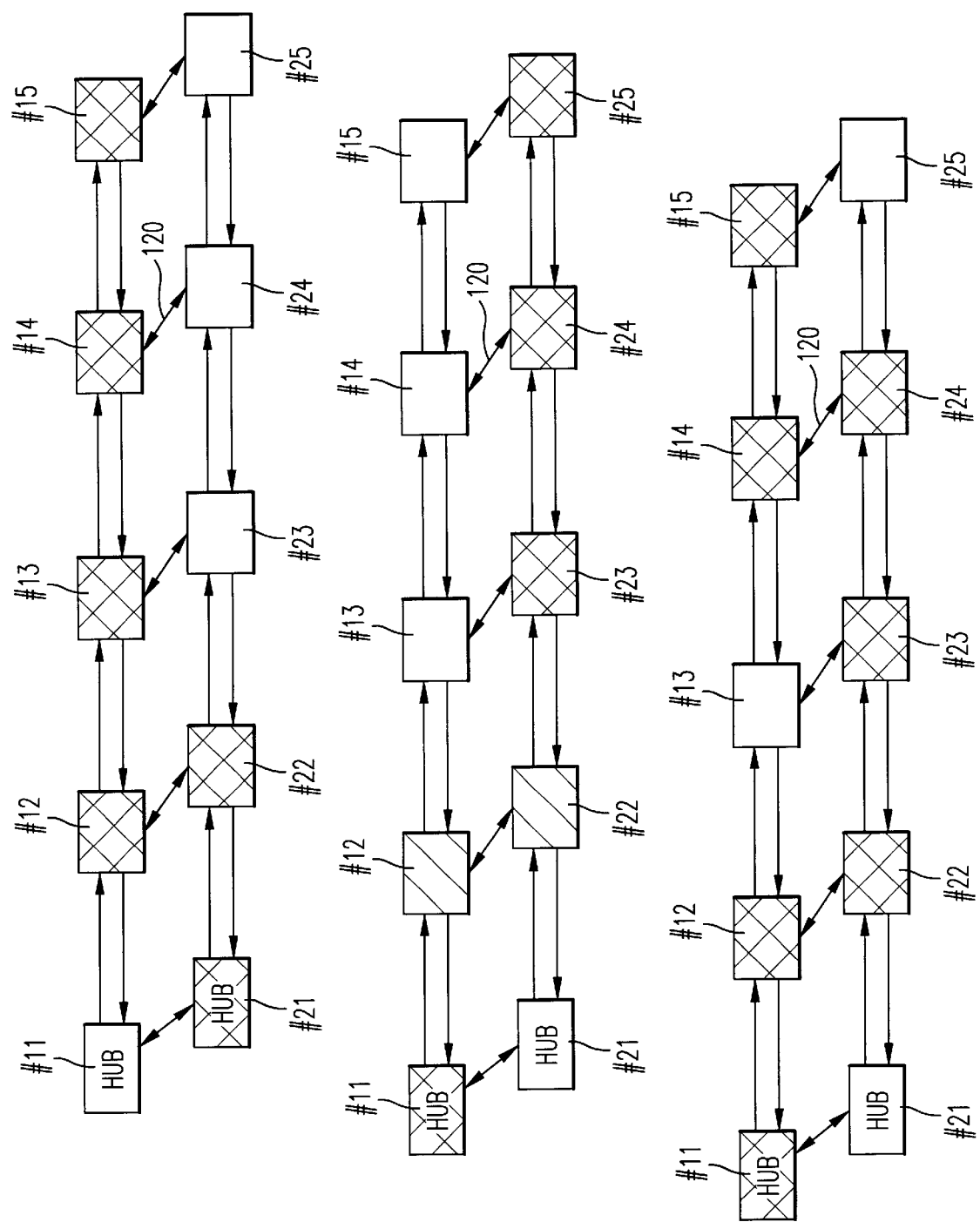
FIG. 9 is a diagram for explaining the reconstruction example avoiding abnormal points in the dual data transmission system shown in FIG. 7.

In FIG. 9, #11–#15 hub units comprise the current use system and #21–#25 hub units comprise the standby system. In FIG. 9(a), when, for instance, #11 hub unit of the current use system becomes abnormal, a new data transmission system is composed by #12–#15 hub units. Thus, the standby system is used when the current use system becomes abnormal. Further, if any abnormality occurs on #23 hub unit of the standby system or on the signal transmission line between #23 and #22 hub units and #21 and #22 hub units are separated, two systems of the #12 through #15 hub units and the #21 and #22 hub units system are incorporated in one unit according to the sequence described above.

Shown in FIG. 9(b) is an example when the #11 and #12 system were incorporated in one unit with the #22, #23, #24 and #25 system as an abnormality occurred on #13 hub unit of the current use system or in the signal transmission line between #12 and #13 hub units and #21 of the standby system was separated as an abnormality. In the example shown in FIG. 9(a), the #21 and #22 system is the upper stream side system and in the example shown in FIG. 9(b), the #11 and #12 system is the upper stream side system.

FIG. 9(c) illustrates a case when #25 of the system in the state shown in FIG. 9(b) further became abnormal. Under this state, as #14 and #15 hub units were in the operating state as the separated data transmission system, the data transmission system comprising #11, #12, #22, #23 and #24 hub units and the data transmission system comprising #14 and #15 hub units are equivalent to the state where they were further incorporated in one unit. In these cases, two sets of hub units of the data transmission system are mutually connected.

To construct such dual data transmission systems, it is only required to add a construction in which two sets of the signal transmission lines 3, 4 are selectable by control signals SL1, SL2 through switches SW1 and SW2 as shown in FIG. 8 to the example of the hub unit hardware configuration shown in FIG. 2. FIG. 8 shows this state, for instance, by regarding the upper side as the current use system and the lower side as the standby system. The control signals SL1, SL2 are output from the I/O register circuit 18. Under the state using two sets of data transmission systems as the current use system and the standby system, points that become abnormal or separated hub units or signal transmission lines are managed. It becomes possible to commonly retain these information by mutually exchanging messages by the transceiver circuit 14 of the hub unit, the LAN control circuit 15 and the microcomputer 17. To maintain the entire system operation even when part of the hub units or the signal transmission lines of the current use system and the standby system become abnormal using remaining normal component elements, it is possible to achieve entire system operation in the sequence to unify the two data transmission systems into one system using two sets of current use and bypass signal input lines and two sets of current use and bypass signal output lines by changing over them with the switch SW1 or SW2 of the hub units as the upper stream and the down stream side signal transmission lines.

In FIG. 9(a), transmitters 115, 117 and 112, 114 shown in FIG. 8 are selected in the #12 hub unit. Further, signal transmission lines 111, 113, 116, 118 are selected in the hub unit #22. In the example shown in FIG. 9(b), the signal transmission lines 111, 113, 116, 118 are selected in the hub unit #12 on the contrary to FIG. 9(a). Also, the transmitters 115, 117, 112, 114 are selected in the hub unit #22. In case of FIG. 9(c), the input/output signal transmission lines are similarly selected but the explanation will be omitted.

The present invention is not restricted to the embodiments described above but is applicable not only to a radio communication system but also applicable to both a wired communication system and an optical communication system as to signal transmission lines between hub units.

Although the hub units are described as concentrators of plural terminals in the above embodiments, it is possible to divert general use cheap products or to use programmable gate arrays, etc. that enable it to integrate hardware logic as described above.

According to the present invention described above, it becomes possible to perform the realtime transmission right control as a single system even when hub units of star-shaped data transmission system are arranged at dispersed locations.

What is claimed is:

1. A data transmission system, comprising:
a plurality of sending and receiving control systems including a plurality of hub units with a plurality of ports, wherein said hub units are connected with signal transmission lines;
a plurality of terminals configured to send and receive data frames, wherein said terminals are connected to said ports of said hub units in a star-shape, wherein at a predetermined point in time one of said plurality of hub units controls approval of data transmission to enable said data transmission system to transmit data frames to said ports of said hub units from corresponding terminals in a prescribed sequence.

2. A data transmission system, comprising:
a plurality of sending and receiving control systems including a plurality of hub units with a plurality of ports, wherein said hub units are connected together with signal transmission lines;
a plurality of terminals configured to send and receive data frames connected to said ports of said hub units in a star-shape; and
relay control means to enable said data transmission system to send data frames sent out from a desired one of said terminals to any of said signal transmission lines other than the signal transmission line on which said sent data frames have been sent, to enable said data transmission system to relay said data frames received from any of said signal transmission lines to other signal transmission lines of said ports of said hub units, and at a predetermined point in time, to enable one of said hub units to send a data frame from terminals corresponding to said ports of said hub units in a prescribed sequence.

3. A data transmission system according to claim 2, wherein said data transmission system is equipped with at least three sending and receiving control systems, and
each of said hub units further includes means for confirming receipt of a transmission-line-control-right-transfer-signal indicating a transmission-line-control-right for starting a transmission approval control wherein, at a point in time of completion of said transmission control approval, said data transmission system is configured for sending out a transmission-line-control-right-transfer-signal to a downstream signal transmission line, is configured to confirm delivery of said transmission-line-control-right-transfer-signal with a preceding hub unit, and is able to confirm that said transmission-line-control-right is transferred from an upper stream side hub unit to a downstream side hub unit or vice versa.

4. A data transmission system according to claim 3, wherein each of said hub units further includes means for supervising the confirmation of delivery of said transmission-line-control-right-transfer-signal from the downstream side hub unit for a prescribed time period after sending the transmission-line-control-right-transfer-signal to the downstream signal transmission line, and if there is no response, to stop sending the transmission-line-control-right-transfer-signal, such that said hub unit tentatively abandons said transmission-line-control-right-transfer-signal thus generating a state without the transmission-line-control-right-transfer-signal, and said data transmission system then again transfers the transmission-line-control-right-transfer-signal from the upper stream side hub unit to the downstream side hub unit.

5. A data transmission system according to claim 3, wherein said terminals include sending and receiving means for functioning as specified in the ISO8802/3 Standard, such that when no signal for the transmission-line-control-right-transfer-signal is present for a sufficiently significant length of time following sending of a preamble signal of said standard, a response to said transmission-line-control-right-transfer-signal is sent from a succeeding downstream hub unit and confirmed by the preamble signal or a data frame of said standard.

6. A data transmission system according to claim 5, wherein said hub unit which received said transmission-line-control-right-transfer-signal sends a preamble signal of the ISO8802/3 Standard to a port of a downstream side hub unit and said upper stream side and downstream side signal transmission lines of said upper stream side hub unit, starts a transmission approval control, and sends ISO8802/3 Standard data from a port of said upper stream side hub unit to a port of a more upper stream side hub unit or a port of said downstream side hub unit or to both a port of said more upper stream side hub unit and a port of said downstream side hub unit after changing said transmission-line-control-right-transfer-signal to said preamble signal, and even in a case when a preamble signal is input from said upper stream side or said downstream side, does not relay said transmission-line-control-right-transfer-signal to said port of said more upper stream side hub unit or said port of said downstream side hub unit.

7. A data transmission system according to claim 5, wherein a hub unit without said transmission-line-control-right relays a signal train of the ISO8802/3 Standard received from an upper stream side hub unit or a downstream side hub unit to a reverse side signal transmission line, and relays a frame signal of said standard to all ports of said hub units and inserts a preamble signal to each port generating a signal state longer than a between frames no-signal state time specified by said standard.

8. A data transmission system control method for a data transmission system equipped with at least three sending and receiving control systems, comprising a plurality of terminals having data frame sending and receiving means connected to a plurality of ports of a plurality of hub units in a star-shape, wherein said hubs of said sending and receiving control systems are connected by signal transmission lines, a relay control means for enabling said data transmission system to send a data frame sent from a desired one of said terminals to any of said signal transmission lines other than the signal transmission line of the terminal of said sent data frame, for relaying said data frame received from said signal transmission line applicable to said terminal of said sent data frame to any other of said signal transmission lines via said ports of said hub units, and at a predetermined point in time, for enabling one of said hub units to send said sent data frame from said corresponding terminal to said ports of said hub units in a prescribed sequence, comprising the steps of:

receiving at-least one of the hub units a transmission-line-control-right-transfer-signal indicating the transmission-line-control-right for starting a transmission approval control, confirming receipt of said transmission-line-control-right-transfer-signal, and at a point in time of completion of said control of transmission approval, sending out a transmission-line-control-right-transfer-signal to another of said signal transmission lines at said downstream side or said upper stream side, confirming delivery of said transmission-line-control-right-transfer-signal with said preceding downstream side hub unit or upper stream side hub unit, and confirming that said transmission-line-control-right is transferred from said upper stream side hub unit to said downstream side hub unit or vice versa; and supervising said delivery of said transmission-line-control-right-transfer-signal from said downstream side hub unit or said upper stream side hub unit for a specified time period after sending out said transmission-line-control-right-transfer-signal to said downstream side signal transmission line or said upper stream side signal transmission line, and if there is no response, stopping the sending of the transmission-line-control-right-transfer-signal, wherein said hub unit supervises a no signal state on said signal transmission lines, and when a significant signal is present on at least one of said signal transmission lines stops, and when a specified time for the presence of a no-signal state has elapsed, acquiring said transmission-line-control-right, sending a transmission-line-control-right-retaining-signal to said upper stream side hub unit and said downstream side hub unit for a sufficiently significant time, and even if a significant signal is input from said downstream side hub unit when sending said transmission-line-control-right-retaining-signal, disregarding said significant signal from said downstream side, and when a significant signal is input from said upper stream side hub unit, stopping to send said transmission-line-control-right-retaining-signal, abandoning said transmission-line-control-right and acquiring said transmission-line-control-right at said uppermost stream side hub unit by starting said transmission approval control after sending said transmission-line control-right-retaining-signal for a sufficiently significant period of time.

9. A data transmission system control method according to claim 8, wherein a preamble signal is used as said transmission-line-control-right retaining signal.

10. A data transmission system control method, for a data transmission system equipped with at least three sending and receiving control systems comprising a plurality of terminals configured to send and receive data frames, a plurality of hub units each including ports wherein said ports of said hub units are connected with signal transmission lines, and wherein said plurality of terminals are connected to said ports of said hub units in a star-shape, comprising the steps of:

sending a data frame sent out from a desired one of said terminals to any of said signal transmission lines other than a signal transmission line of said terminal of said sent out data frame;

relaying said data frame received from said signal transmission line of said terminal of said sent out data frame to other signal transmission lines via said ports of said hub units and at predetermined point in time;

enabling one of said hub units to send data frames from said corresponding terminal to said ports of any other of said hub units in a prescribed sequence;

receiving a transmission-line-control-right-transfer-signal indicating a transmission-line-control-right for starting a transmission approval control;

at a point in time of completion of said transmission approval control, sending out a transmission-line-control-right-transfer-signal to another of said signal transmission lines at a downstream side or an upper stream side, confirming delivery of said transmission-line-control-right-transfer-signal with a preceding downstream side hub unit or an upper stream side hub unit and confirming transfer of said transmission-line-control-right from said upper stream side hub unit to said downstream side hub unit or vice versa;

supervising said delivery of said transmission-line-control-right-transfer-signal from said downstream side hub unit or said upper stream side hub unit for a specified time period after sending out said transmission-line-control-right-transfer-signal to said downstream side transmission line or said upper stream side signal transmission line, and if there is no response, stopping the sending of said transmission-line-control-right-transfer-signal, wherein upon addition of a new sending and receiving control system to said uppermost stream side or said lowermost stream side of said sending and receiving control system, cutting off signals sent to said upper stream side and said downstream side at an initial starting time when power is turned ON, and after a present waiting time has elapsed, supervising the presence of significant signals on said signal transmission lines at said upper stream side and said downstream side, releasing the cutoff of sending signals to said upper stream side and said downstream side when a significant signal is input from said upper stream side or said downstream side, relaying input signals to all ports and a reverse side signal transmission line; and when said transmission-line-control-right-transfer-signal is received from said upper stream side from a hub unit of said lowermost stream, performing said transmission approval control, and if there is a significant signal present only from said downstream side, acquiring said transmission-line-control-right at a hub unit positioned at said uppermost stream side and adds a new sending and receiving control system to said uppermost stream side or said lowermost stream side of said sending and receiving control system by starting a new transmission cycle.

11. A data transmission system multiplexing method incorporating two separate data transmission systems into one system, wherein said two separate data transmission systems, each equipped with a plurality of sending and receiving control systems including a plurality of hub units each with ports and a plurality of terminals having data frame sending and receiving means connected to said ports of each of said hub units in a star-shape, said hub units of said plurality of sending and receiving control systems connected by signal transmission lines, comprising the steps of:

performing a transmission approval control, wherein at a predetermined point in time, one of said plural hub units sends data frames from a terminal corresponding to a port of said hub units in a prescribed sequence;

cutting off said sending of data frames to a downstream side signal transmission line and a signal relay from said downstream side for the most downstream side hub unit of said plurality of hub units of a desired one of said plural data transmission systems;

connecting an upper stream side signal transmission line of a hub unit located at an uppermost stream side of said other data transmission system to said downstream side signal transmission line and receiving a transmission-line-control-right-transfer-signal; and after performing a transmission approval control, sending a transmission-line-control-right-transfer-signal to said downstream side, releasing the cut off of the sending of data frames to said downstream side and said signal relay cut off from said downstream side, and relaying significant signals from said downstream side data transmission system to said ports of said hub units connected to all of said upper stream side hub units.

12. A data transmission system multiplexing method incorporating two sets of data transmission systems into one system maintaining a data transmission function, wherein a plurality of hub units including ports connected to one another by signal transmission lines, and two sets of data transmission systems comprising a separate current use data transmission system and a standby data transmission system, each of said separate data transmission systems equipped with plural sending and receiving control systems having a plurality of terminals, said plurality of terminals of said sending and receiving control systems each including data frame sending and receiving means and connecting to said ports of said hub units in a star-shape, comprising the steps of:

at a predetermined point in time, enabling one of said plurality of hub units through a transmission approval control by sending data frames from a terminal corresponding to said ports of said hub units in a prescribed sequence, said hub units further including two sets of current use and bypass signal inputs and current use and bypass signal outputs functioning as upper stream side and downstream side signal transmission lines;

using said current use data transmission system;

turning said system over to said standby data transmission system if said current use data transmission system becomes abnormal from disconnection of at-least one of said hub units of said current use system or disconnection of at least one of said signal transmission lines; and connecting said normal hub units and signal transmission lines of said current use and standby data transmission systems to one another using said bypass signal input and bypass signal outputs of said hub units if at least one of said hub units of said standby data transmission system or said signal transmission lines become abnormal.

* * * * *